United States Patent [19]

Cioffi

[11] Patent Number: 4,713,918

[45] Date of Patent: Dec. 22, 1987

[54] MODULAR WALL SYSTEM

[75] Inventor: Victor E. Cioffi, Mahwah, N.J.

[73] Assignee: Nabisco Brands, Inc., Parsippany, N.J.

[21] Appl. No.: 824,150

[22] Filed: Jan. 30, 1986

[51] Int. Cl.[4] ..................... E04F 17/08; E04F 19/08; H02G 3/12; H02G 3/16

[52] U.S. Cl. ..................................... 52/221; 52/242; 174/48

[58] Field of Search ............... 52/220, 242, 239, 290, 52/221, 287, 127.12; 160/135; 174/48

[56] References Cited

U.S. PATENT DOCUMENTS

| | | | |
|---|---|---|---|
| 1,718,252 | 6/1929 | Putnam | 52/220 |
| 3,193,061 | 7/1965 | Downes | 52/242 X |
| 3,708,607 | 1/1973 | Brode et al. | 52/287 X |
| 3,865,969 | 2/1975 | Mulvey | 174/48 |
| 4,043,626 | 8/1977 | Propst et al. | 52/242 X |
| 4,133,153 | 1/1979 | Hage | 52/220 |
| 4,158,936 | 6/1979 | Fulton | 52/242 |
| 4,375,010 | 2/1983 | Mollenkopf | 174/48 |
| 4,406,101 | 9/1983 | Heidmann | 52/220 |
| 4,470,232 | 9/1984 | Condevaux et al. | 52/220 |
| 4,567,698 | 2/1986 | Morrison | 52/239 X |

FOREIGN PATENT DOCUMENTS 2060022  4/1981  United Kingdom ................. 52/239

Primary Examiner—Alfred C. Perham
Attorney, Agent, or Firm—Richard Kornutik

[57] ABSTRACT

A modular wall system for use in partitioning office, retail and other space is disclosed. The wall system includes a base which supports a wall panel. In one embodiment, the base comprises a unitary extruded beam having a web extending between a top and bottom flange and a mid-flange located between the top and bottom flanges. A plurality of cover plates cover the sides of the beam and provide a plurality of ducts for power and communications wiring. In another embodiment, the base comprises a top plate and a bottom plate, which plates are supported in parallel spaced relation by a plurality of columns. Two covers extend the length of the base and, form a rigid box structure with the top and bottom plates.

11 Claims, 12 Drawing Figures

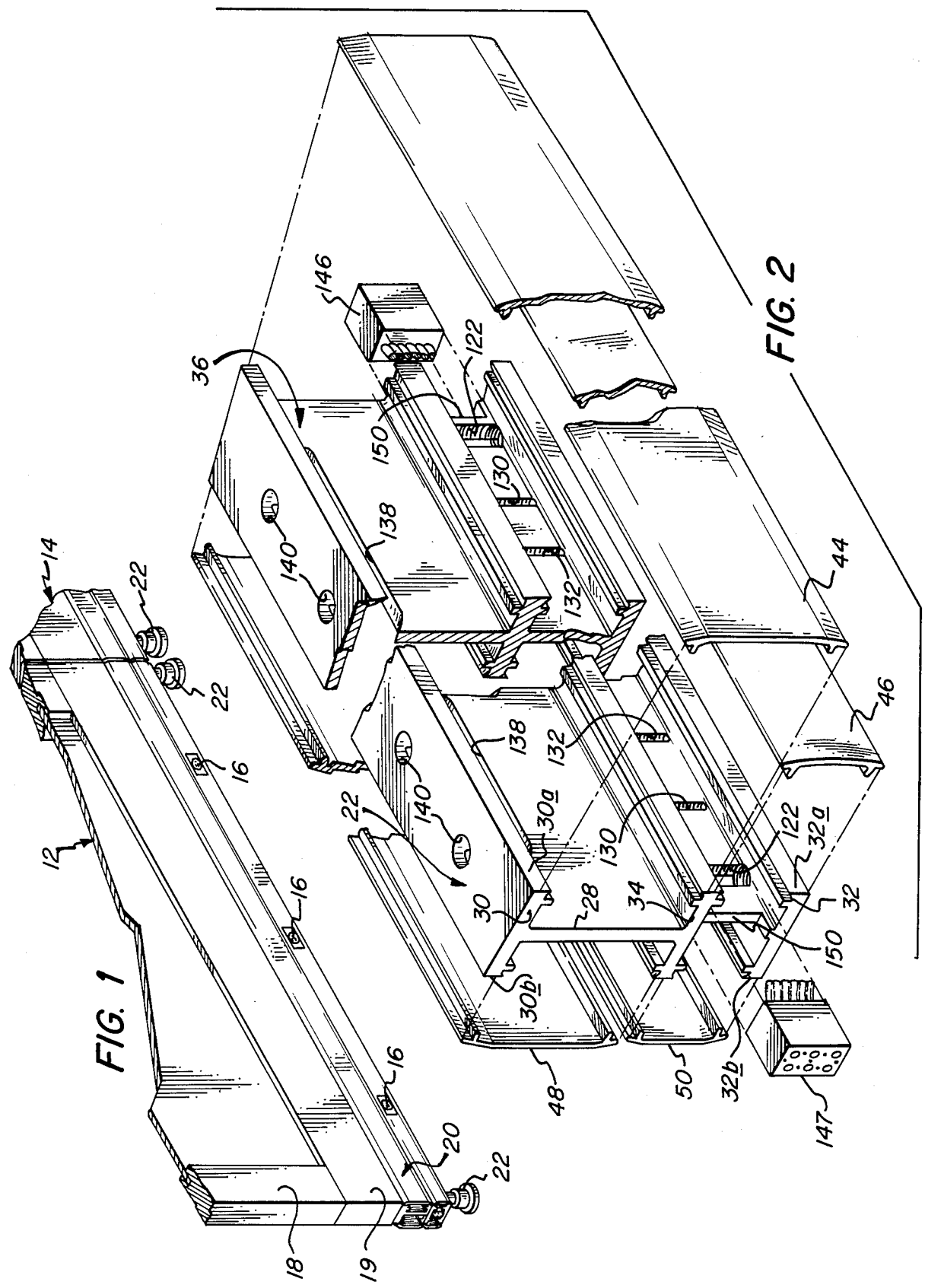

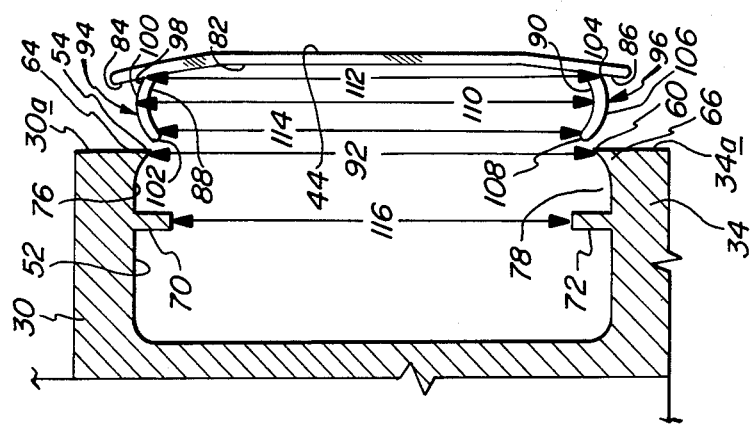
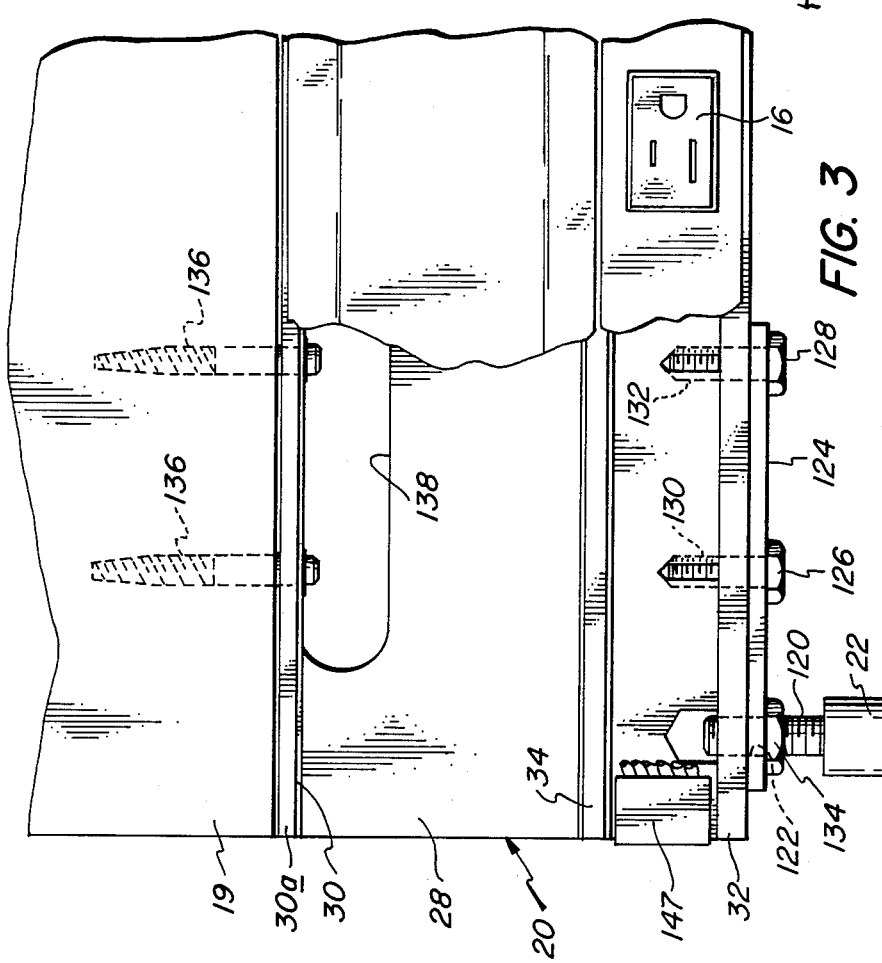
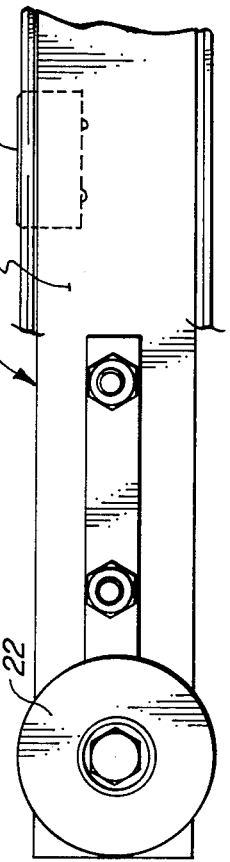
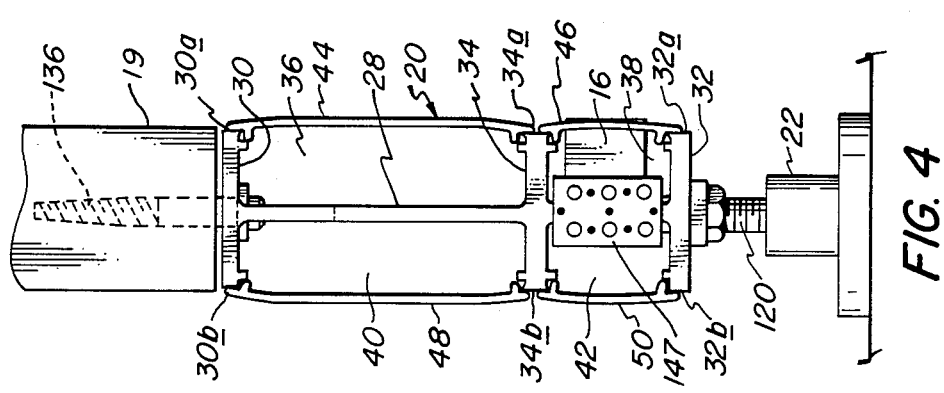

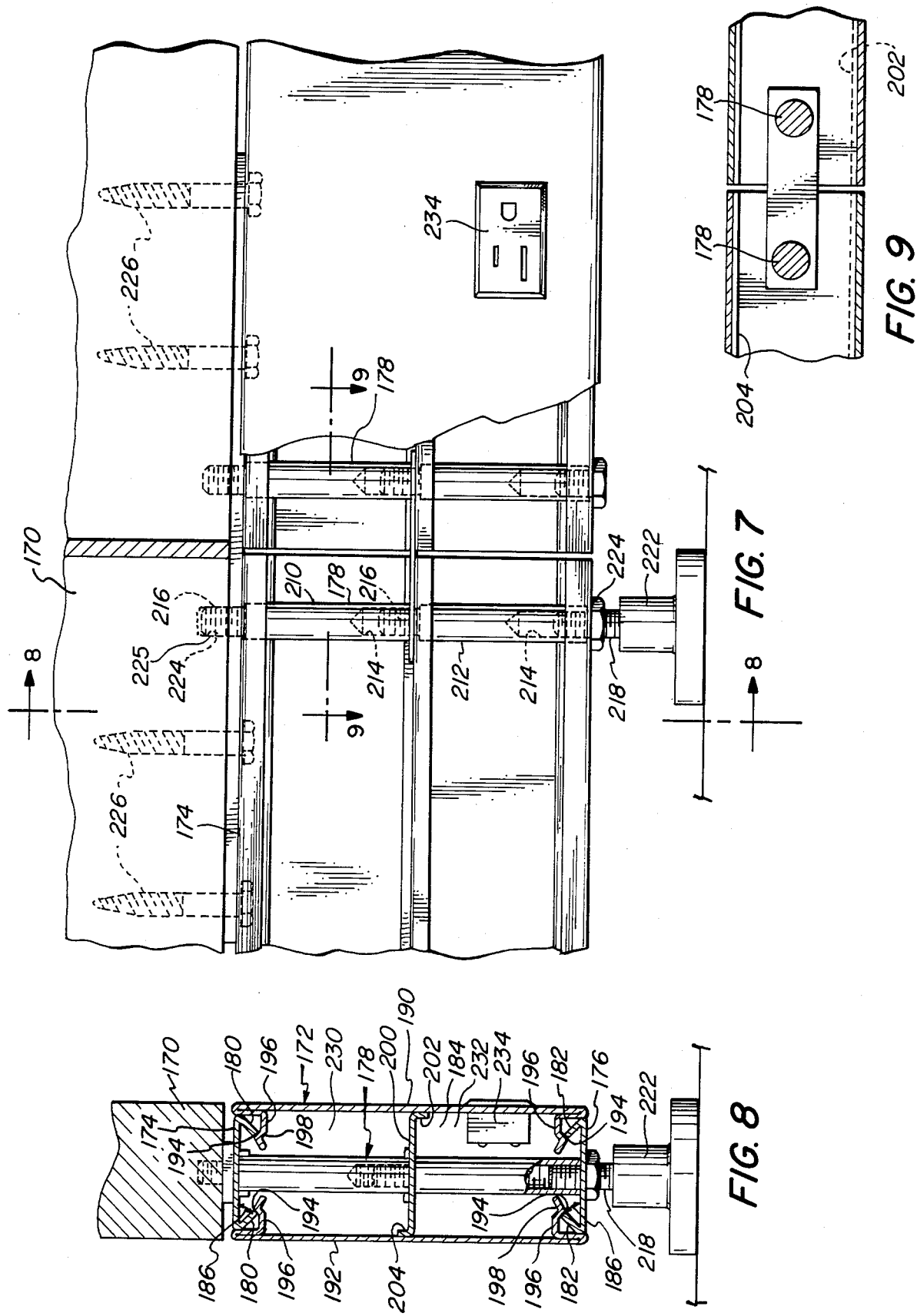

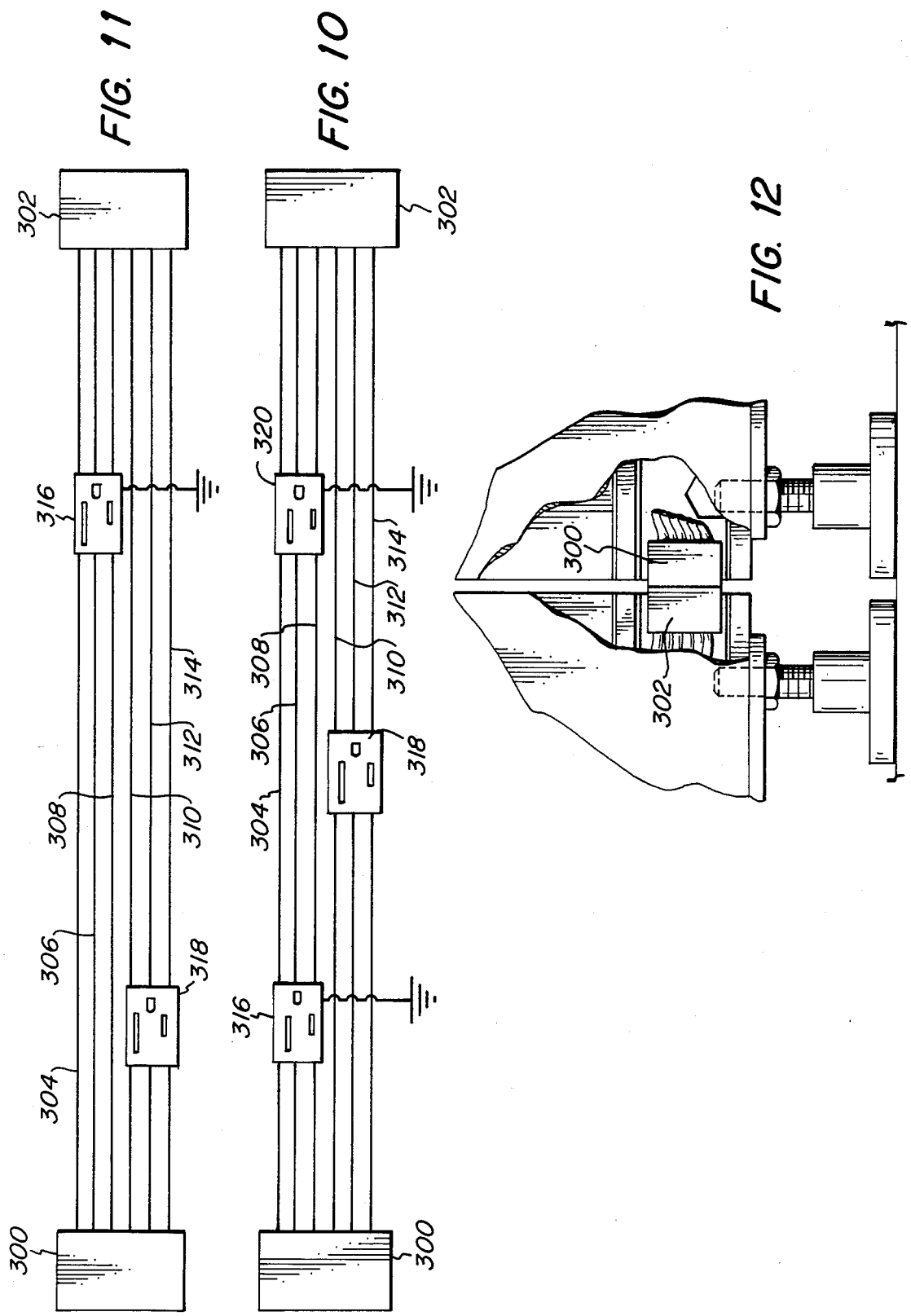

MODULAR WALL SYSTEM

BACKGROUND OF THE INVENTION

The present invention relates to a modular wall system for use in partitioning office, retail and other space. More particularly, the present invention relates to a modular wall system including power and communications wiring.

Conventional modular wall systems include an elongate supporting base and a wall panel secured to the supporting base. The supporting base extends lengthwise along the floor and its upper surface supports a wall panel. Numerous wall systems may be connected to each other, either in linear relation or in angular relation, and are used to form a partitioned space.

It is known to form the base from an aluminum extrusion having a uniform cross-section along its length, and having the shape of an I-beam. It is also known to attach cover panels along the length of the I-beam to provide an asthetically pleasing appearance and to obscure power and communications wiring which is placed within the I-beam beneath the cover panels. Examples of such constructions are disclosed in U.S. Pat. No. 3,708,607 to Brody et al and U.S. Pat. No. 4,470,232 to Condevaux et al. These conventional constructions for bases for modular wall panel systems are complicated and require the wall panel to be interconnected with the upper surface of the base upon which the wall panel is supported.

It is an object of the present invention to provide a modular wall system having a base that is particularly simple in construction, and may be produced from the extrusion of a unitary beam. It is another object of the invention to provide a wall panel system wherein separate ducts for electrical power and for communication wiring are provided and where the separate ducts have a cover associated with each duct. Moreover, it is a further object of the invention to provide a simple and inexpensive mechanism for securing the cover plates to the base. Additional objects of a modular wall system in accordance with the present invention will be apparent from the description which follows.

SUMMARY OF THE INVENTION

In accordance with the present invention, a modular wall system is provided and comprises a wall panel, and an elongate base having a substantially uniform cross-section along its length. The base comprises an extruded unitary beam, preferably made from an extruded aluminum alloy. The beam has a web extending from a top flange to a bottom flange, and intersecting with a midflange. The beam is symmetric with respect to a central plane through its web. Ducts for power and communication wiring are provided between the flanges of the beam.

Each flange includes at least one edge which slopes inwardly toward its respective flange to define a retaining protrusion which cooperates with a rail on the cover which is secured to the flange. The beam also includes a stop lug protruding into the duct from the flange for each retaining protrusion, and the stop lug is spaced from its respective retaining protrusion to define a channel for receiving a rail of the cover plate.

For each cover plate and its two associated flanges, the edges are spaced apart a predetermined distance. The rails protruding from the interior face of the cover plate has a convex outer surface that includes a base adjacent the plate, and apex and a tip. The apexes are spaced apart a distance greater than the distance between the edges of the flanges so that when the rails are forced inwardly by pressing on the cover plate, the apexes of the rails snap past the edges and are retained in the channel defined between the edge and its associated stop lug.

In accordance with one aspect of the invention, the base includes modular wiring, that is, when adjacent modular wall systems are placed in linear or angular relation to each other, the wiring of adjacent panels can be connected by a conventional electrical plug. In accordance with one aspect of the invention, the beam of the base includes a terminal end and a portion of the web is cut out to provide a cavity for receiving a plug. Both ends of the rail include a plug, one female and the other male. When one modular wall system is placed in end to end relation with another modular wall system, the plugs are interconnected and the cavities permit the plugs to be recessed and out of view. The cover plate includes one or more electrical power outlets along its length.

In accordance with another aspect of the invention, the base is easily attached to the wall panel which is supported on the base. In accordance with this aspect of the invention, holes are drilled through the top flange and into the web of the beam and such holes are spaced apart and receive a plurality of fasteners which are secured to the wall panel supported on the upper surface of the top flange.

In another embodiment of the invention, the base includes a top plate extending the length of the base and a bottom plate extending the length of the base. The plates are supported in spaced parallel relation to each other by a plurality of columns secured to said plates. Each plate has an edge extending the length of said plate and including a reinforcing member directed into a space between the plates. The reinforcing member is located at an angle of between zero and ninety degrees with respect to the plate and preferrably forty-five degrees with respect to the plate.

A cover extends the length of the base and has a height sufficient to span a distance between the edge of said top plate and the edge of said bottom plate. Each cover has a pair of rails extending inwardly into the space between the plates. For each rail and the associated terminal edge of said reinforcing member, a mechansim for detachably securing the rail to said reinforcing member is provided. The assembled base comprises a rectangular box construction wherein the top plate, the bottom plate, and the two covers form sides of said rectangle, thereby providing a rigid structure.

BRIEF DESCRIPTION OF THE DRAWINGS

FIG. 1 is a perspective view of a modular wall system in accordance with the present invention;

FIG. 2 is a perspective exploded view of the base for the modular wall system shown in FIG. 1;

FIG. 3 is a side view of a portion of the modular wall system shown in FIG. 2 assembled, with a portion of the cover plates broken away;

FIG. 4 is an end view of the wall system shown in FIG. 3;

FIG. 5 is a bottom view of the wall system shown in FIG. 3;

FIG. 6 is a sectional view taken through two flanges of the base and the cover plate associated with the two flanges;

FIG. 7 shows an alternative embodiment of a wall panel system in accordance with the present invention, and shows a side view of two assembled wall panel systems;

FIG. 8 shows a sectional view of the wall panel system shown in FIG. 7 through the plane 8—8;

FIG. 9 shows a view of the connection between the wall panel systems through the plane 9—9;

FIG. 10 shows a schematic view of a three outlet, two circuit wiring system for a panel in accordance with the present invention.

FIG. 11 shows a schematic view of an alternative embodiment of a wiring system, and shows a two outlet, two circuit wiring system.

FIG. 12 shows a side view of two panel systems assembled with the electrical connection made.

DETAILED DESCRIPTION OF THE INVENTION

Referring to FIG. 1, wall panel systems 12 and 14 are shown. The modular panel systems may be connected to each other to provide a wall, and electrical connectors, described hereinafter, are connected to provide power to multiple outlets 16 along the base of each system. The wall system includes a wall panel 18 having a generally rectangular shape and having a bottom portion 19 supported on a elongate base 20. The base 20 is supported on the floor by a plurality of pedestals 22.

The wall panel 18 may be of any suitable construction, such as wood and wood composites, plastic laminates, sheet metal, or other materials. The materials of the panel, and its construction, are selected to have asethetically pleasing features in a desired environment.

Referring in particular to FIGS. 2-6, the elongate base 20 for supporting the wall panel 18 will now be described. The base 20 comprises a beam and cover plates 44, 46, 48 and 50 secured to each side of the beam. The beam has a substantially uniform cross-section along its length and comprises an extruded unitary structure having a web 28 extending from a top flange 30 to a bottom flange 32. The beam is preferably extruded for an aluminum alloy, most preferrably an aluminum alloy. The beam also includes a mid-flange 34 located between and spaced from the top and bottom flanges 30 and 32. The beam is symmetric with respect to a central plane running the length of the beam. The central web 28 is coincident with the central plane and the flanges 30, 32, and 34 extend in generally parallel relation to each other and in substantially perpendicular relation to the web 28.

Flange 30 has two terminal ends 30a and 30b. Similarly, flanges 32 and 34 include respectively terminal ends 32a, 32b and 34a, 34b. Preferably, the terminal ends extend parallel to the central plane and are spaced substantially equal distances from the central plane. As shown particularly well in FIG. 4, flanges 30 and 34 and the web 28 define a first duct 36 extending the length of the base. Similarly, the flanges 32 and 34 and the web 28 define a second duct 38 also running the length of the beam. Similarly, ducts 40 and 42 are located on the other side of the central web.

Referring in particular to FIGS. 4 and 6, the mechanisms for securing the cover plates to the beam will now be described. Each duct 36, 38, 40 and 42 includes a respective cover plate 44, 46, 48 and 50. Because the mechanism for securing each cover plate to its respective duct area of the beam is identical, only the securement of cover plate 44 to flanges 30 and 34 will be described in detail. Flange 30 has a lower surface 52 which intersects with end 30a to define an edge 54 extending the length of the beam. The mid-flange 34 has an upper surface which intersects end 34(a) to define edge 60 also extending the length of the beam. For each edge 54 and 60, the surfaces adjacent the edge slope inwardly toward its respective flange to define respectively retaining protrusions 64 and 66. For each protrusion 64 and 66, its respective flange includes a stop lug 70 and 72 which is spaced a predetermined distance from its respective edge to define between each protrusion and its respective lug a channel 76 and 78.

Elongate cover plate 44 has an interior face 82, which face includes top and bottom margin areas 84 and 86 running the length of the plate. When the plate 44 is installed, as shown in FIG. 4, the margin areas 84 and 86 abutt the flange ends 30a and 34a. Each margin area has rail 88 and 90 extending into the channel 76 and 78. For each cover plate and its two associated flanges, the edges 54 and 60 are spaced a predetermined flange distance 92. Each rail 88 and 90 has a convex surface 94 and 96. Convex surface 94 includes a base 98 adjacent the margin area 84, an apex 100 and a tip 102. Likewise, surface 96 includes a base 104, an apex 106 and a tip 108. The distance 110 between the apex 100 and the apex 106 is larger than the flange distance 92. The distance 112 between the bases 98 and 104 is smaller than the flange distance 92. Also, the distance 114 between the tips 102 and 108 is less than the distance 114 between the tips 102 and 108 is less than the distance 92 between the flanges. Such spacing permits insertion of the tips 102 and 108 between the edges 54 and 60. As the rails are forced further into their respective channel, the edges 54 contact the convex surfaces at their respective apexes 100 and 106 and deform the rails slightly inwardly. The apexes 100 and 106 slide past the edges 54 and 60 and come to rest adjacent the bases 98 and 104 of the rails. The stop lugs 70 and 72 are spaced a sufficient lateral distance from their respective edges 54 and 60 to permit insertion of the rail. In channels 76 and 78 the ends of the lug 70 and 72 are spaced apart a distance 116 which is preferrably less than the distance 114 between the tips 102 and 108.

As shown in FIGS. 2, 3 and 5, legs 22 include a threaded cylindrical support 120. The threaded support 120 is inserted into an aperture 122 in plate 124. The plate 124 is secured to the beam by lag bolts 126 and 128 which are screwed into threaded holes 130 and 132. A lock nut 134 is provided for each leg support 120 and enables the user to lock the leg 22 in a particular height.

Referring in particular to FIGS. 2 and 3, the panel 19 is secured to the flange 30 by a series of lug nuts 136. The web 28 beneath the lug nuts 136 includes a cutout 138 which permits access to the heads of lug nuts 136 which extend through holes 140.

The modular wall panel system may include power wiring extending in either duct 38 or duct 42. For each wall panel system, a conventional multi-pin plug 146 and socket 147 are provided. The wiring is connected to power outlets 16 extending along the length of the cover plate 46. Communications, or other wiring, may be inserted in ducts 36 and 40 with appropriate outlets and connections. As shown particularly well in FIG. 2, the web 28 includes a cutout 150 sized to receive on either end the back of the plug 146 and the socket 147.

In the base shown in FIG. 2, the plug and socket each have a convex surface and, thus, the webs include a concave cutout 150 for receiving the plug and the socket.

Referring to FIGS. 7–9, an alternative embodiment of a wall panel system is shown. The wall panel system includes a panel 170 having the bottom thereof attached to a base 172. Base 172 includes a top plate 174 and bottom plate 176 extending the length of base 172 and held in spaced relation by a plurality of columns 178. The top and bottom plates 174 and 176 each comprise a flat plate having its marginal edges 180 and 182 extending into the space 184 between plates 174 and 176. Preferrably, the angle 186 between the marginal edges and their respective plates is 45 degrees. However, it should be understood that angle 186 may range from slightly over zero degrees to approximately 90 degrees. The marginal edges function to reinforce their respective top and bottom plates 174 and 176. The plates have terminal edges which function as a locking mechanism for the cover plates 190 and 192 on either side of the base. The terminal edges 194 extend the length of the top and bottom plate. The covers 190 and 192 include for each terminal edge 194, a rail 196 which extends inwardly and has a protrusion 198. The distance between the protrusions on any one plate is greater than the distance between the terminal edges 194 of the associated marginal edges so that when the covers 190 and 192 are pressed into place, the rails flex and permit the protrusion to snap past the terminal edges 194 and hold the covers 190 and 192 in place.

In accordance with one aspect of the invention, the base 172 may include an intermediate divider 200 having flanged ends 202 and 204 preferably extending in a plane at right angles to the intermediate divider 200.

In accordance with one aspect of the invention, the column includes column segments 210 and 212. Each column segment includes a threaded bottom opening 214 and a threaded screw 216 extending upwardly from the other end. The intermediate divider 200 includes apertures sized to be received by the threaded screw 216 of the lower segment 212. The holes in the intermediate divider are smaller than the outer diameter of the column 210 and 212 so that when the two segements are screwed together with the intermediate divider therebetween, the divider is held fixed in placed. The threaded opening 214 of the bottom column segment receives the threaded support post 218 of base 222. The height of the base may be locked into place by lock nut 225. Similarly, the threaded end of segment 210 may be secured into a threaded opening 224 in the wall panel 170. Additionally, the wall panel may be secured to the top plate 174 by plurality of lag bolts 226.

In accordance with a preferred aspect of the invention, the top plate 174, the bottom plate 176, the covers 190 and 192 and the intermediate divider 200 may be formed of sheet metal and bent to the configuration discussed earlier. Inasmuch, as the top plate and bottom plate and the two covers 190 and 192 formed a box structure, the base has a substantial rigidity for its weight. The box structure allows for the use of two column supports over the length of the wall thereby making the base rleatively simple, yet strong. The intermediate divider 200 divides the space 184 into a communications duct 230 and a power duct 232 having a series of outlets 234 along its length.

Referring to FIGS. 10 through 12, two embodiments of a power wiring system will now be described. Referring to FIG. 10, a two circuit, three outlet power harness for the wall system is shown. A two circuit system has the advantage that one circuit can be controlled by a wall switch for operating lights while the other can be used for word processors, computers and other business machines. The system includes connectors 300 and 302 at either end having 6 connection points, 304, 306, 308, 310, 312 and 314, which correspond respectively, to a power circuit(black), a ground circuit(green), a neutral circuit(white), a second power circuit(red), a second ground circuit(Gn-Yt) and a second netural circuit(gray). The outlets 316, 318 and 320 can be located on either side of the panel, but preferrably, the outlets are located on one side of the panel. This can be well appreciated, the systems for each panel interconnect thereby enabling assembly of multiple wall systems with electrical power.

Referring to FIG. 11, a two circuit, two outlet system is shown. Outlets 316 and 320 are wired in series on one circuit while outlet 318 is wired in the second circuit. Wires 306–314 are as described with reference to FIG. 10. As shown in FIG. 12, the connectors 302 and 300 of adjacent wall systems are interconnected to make electrical connection. As is shown in the drawings, the electrical connectors 302 and 300 are recessed to permit face to face assembly of adjacent wall systems.

In summary, a modular wall system in accordance the invention is particularly simple in construction, strong, and provides ample ducting for power and communications wiring.

It should be understood that although specific embodiments of the invention have been described herein in detail, such description is for purposes of illustration only and modifications may be made thereto by those skilled in the art within the scope of the invention.

What is claimed is:

1. A modular wall system comprising:
    a wall panel;
    an elongate base having a substantially uniform cross-section along its length, said base comprising an extruded unitary beam having a web extending from a top flange to a bottom flange, said beam being symmetric with respect to a central plane, said web being coincident with said central plane said beam having a mid-flange located between and spaced from said top and bottom flanges, said flanges extending in substantially parallel relation to each other and substantially perpendicular relation to said central plane, each said flange having two ends spaced substantially equal distance from said central plane, said flanges and said web defining on each side of said central plane a first duct between said top and mid-flange and a second duct between said mid-flange and said bottom flange;
    means for securing said wall panel to said top flange;
    said top flange having a lower surface intersecting with said top flange ends to define two edges extending along the length of said beam, said mid-flange having upper and lower surfaces intersecting with said mid-flange ends to define four edges extending along the length of said beam, said bottom flange having an upper surface intersecting with said bottom flange ends to define two edges extending along the length of said beam;
    for each said edge, said flange surfaces adjacent said edge sloping inwardly toward its respective flange to define a retaining protrusion, said beam including a stop lug for each said protrusion spaced a predetermined distance from said edge to define between each said protrusion and its respective lug a channel;

an elongate cover plate for each said duct to provide independent access to each of the four ducts in said base, each cover plate having an interior face, each said face having margin areas extending the length of the plate and abutting said flange ends, each said margin area having a rail extending into said channel between said retaining protrusion and said stop lug of the abutting flange; and for each cover plate and its two associated flanges, said edges of said flanges being spaced a predetermined flange distance, each said cover plate rail protruding from its margin area and having a convex surface, said convex surface including a base adjacent the margin area, an apex, and a tip, said apexes being spaced a predetermined apex distance larger than said flange distance, said base and said tip of one rail being spaced from said base and said tip of said other rail distances less than said flange distance, thereby permitting insertion of said tips between said edges and forcing of said apexes into said channels to retain each said cover plate with respect to its flanges.

2. A modular wall system according to claim 1 wherein at least one duct includes therein wiring for power, said wiring including a male plug at one end of the base and a female plug at the other end of the base for interconnecting the power wiring of adjacent wall systems, said cover plate including at least one power outlet connected to said power wiring.

3. A system according to claim 2 wherein said beam comprises an extruded aluminum alloy.

4. A wall system according to claim 5 wherein said margin areas of said cover plates cover at least a portion of the ends of said flanges.

5. A wall system according to claim 1 wherein said top flange includes a plurality of holes therein, said web immediately beneath each said hole including a cutout, said system further including fastening means extending through said hole upwardly into said wall panel to secure said wall panel to said base, each said cutout permitting access to said fastener means.

6. A wall system according to claim 1 wherein said bottom flange includes a plurality of threaded holes therein said threaded holes extending into said central web for securement of a leg to said beam.

7. A modular wall system according to claim 1 wherein each said lug has a terminal end, said lugs being spaced apart a predetermined distance which is less than the distance between the tips of the respective rails of the associated cover plate.

8. A wall system according to claim 1 wherein said beam has two ends, the web at said ends in the region of the second duct having a recess to provide for an electrical connector flush with the end of the beam and to provide for connection of adjacent modular wall systems in face to face relation to each other.

9. A modular wall system comprising:

a wall panel;

an elongate base including a top plate extending the length of the base and a bottom plate extending the length of the base, said plates being supported in spaced parallel relation to each by a plurality of columns secured with respect to said plates, each said plate having an edge extending the length of said plate and including a reinforcing member extending the length of the base and directed into a space between the plates, each said reinforcing member having a terminal edge;

a cover extending the length of the base and having a height sufficient to a span a distance between the edges of said top plate and the edges of said bottom plate, each said cover having a pair of rails extending inwardly into the space between the plates, for each said rail, said rail and said terminal edge of said reinforcing member including means for detachably securing said rail to said reinforcing member comprising a protrusion extending the length of each said rail, the distance between said protrusions on said rails of said cover being greater than the distance between the terminal ends of said reinforcing members, said rail and said reinforcing members being resiliently flexible to permit the protrusions to ride over said terminal ends to secure said covers with respect to said top and bottom plates, said assembled base comprising a rectangular box construction wherein the top plate, the bottom plate, and the two covers form sides of said rectangle, to provide a rigid structure;

said top and bottom plates and said covers comprising sheet metal, and said reinforcing members comprising a section of the sheet metal bent at an angle between zero and ninety degrees with respect to said top and bottom plates;

a divider spaced between said top plate and said bottom plate, said divider extending the length of said base, and including edges abutting said cover; and means for securing said wall panel to said top plate of said base.

10. A wall system according to claim 9 wherein each said column comprises a segment extending between said bottom plate and said divider and another segment extending between said divider and said top plate, said column segments being secured together to form said column and to retain said divider therebetween.

11. A wall system according to claim 10 wherein said one column segment includes a threaded screw and wherein said another column segment includes a threaded aperture, said divider including a hole sized to receive said threaded screw of said one segment, but having a diameter less than the diameter of said another column segment, said column segments, when assembled, retaining said divider therebetween.

* * * * *